US009083972B2

(12) United States Patent
Jang et al.

(10) Patent No.: US 9,083,972 B2
(45) Date of Patent: *Jul. 14, 2015

(54) ENCODER AND DECODER

(75) Inventors: Euee-S Jang, Seoul (KR); Sun-Young Lee, Seoul (KR); Chung-Ku Lee, Incheon (KR)

(73) Assignee: HUMAX HOLDINGS CO., LTD., Yongin-si (KR)

(*) Notice: Subject to any disclaimer, the term of this patent is extended or adjusted under 35 U.S.C. 154(b) by 1924 days.

This patent is subject to a terminal disclaimer.

(21) Appl. No.: 11/996,264

(22) PCT Filed: Jun. 26, 2006

(86) PCT No.: PCT/KR2006/002465
§ 371 (c)(1),
(2), (4) Date: Oct. 8, 2010

(87) PCT Pub. No.: WO2007/011116
PCT Pub. Date: Jan. 25, 2007

(65) Prior Publication Data
US 2011/0064140 A1    Mar. 17, 2011

(30) Foreign Application Priority Data

Jul. 20, 2005  (KR) .................. 10-2005-0066015
Oct. 18, 2005  (KR) .................. 10-2005-0098317

(51) Int. Cl.
*H04N 11/02*    (2006.01)
*H04N 19/12*    (2014.01)
(Continued)

(52) U.S. Cl.
CPC ............... *H04N 19/12* (2014.11); *H04N 19/20* (2014.11); *H04N 19/46* (2014.11); *H04N 19/61* (2014.11); *H04N 19/70* (2014.11)

(58) Field of Classification Search
CPC .................................................. H04N 7/26457
See application file for complete search history.

(56) References Cited

U.S. PATENT DOCUMENTS 5,452,006 A * 9/1995 Auld ..................... 375/240.26
5,652,823 A * 7/1997 Eto ........................ 386/351
(Continued)

FOREIGN PATENT DOCUMENTS

EP    1351512 A2    10/2003
EP    1351515 A2    10/2003
(Continued)

OTHER PUBLICATIONS

Mitchell et al. "MPEG Video Compression Standard" (Oct. 1996) Kluwer Academic Publishers. NY: New York.*
(Continued)

*Primary Examiner* — Sath V Perungavoor
*Assistant Examiner* — Janese Duley
(74) *Attorney, Agent, or Firm* — Birch, Stewart, Kolasch & Birch, LLP

(57) ABSTRACT

Provided are bitstream encoding/decoding methods and devices. The decoder includes: a condition information extracting unit creating recognition information using syntax tree information indicating a hierarchical structure between syntax elements corresponding to bits of an input bitstream, respectively and rule description information indicating connectivity between the syntax elements; and a decoding unit decoding data contained in the bitstream into moving image data using the recognition information. Accordingly, it is possible to decode bitstreams encoded in a variety of types (syntax, semantics) corresponding to a variety of standards (for example, MPEG-1, MPEG-2, MPEG-4, and MPEG-4 AVC) by the use of the same information recognition method.

15 Claims, 9 Drawing Sheets

(51) Int. Cl.
*H04N 19/70* (2014.01)
*H04N 19/46* (2014.01)
*H04N 19/61* (2014.01)
*H04N 19/20* (2014.01)

(56) References Cited

U.S. PATENT DOCUMENTS

| | | | |
|---|---|---|---|
| 6,332,139 B1 * | 12/2001 | Kaneko et al. | 1/1 |
| 6,529,528 B1 * | 3/2003 | Park et al. | 370/535 |
| 6,631,376 B1 * | 10/2003 | Yamamoto et al. | 1/1 |
| 6,657,569 B2 * | 12/2003 | Barnett | 341/65 |
| 6,741,191 B2 * | 5/2004 | Jang et al. | 341/65 |
| 6,819,712 B2 | 11/2004 | Kawashima et al. | |
| 6,919,826 B1 * | 7/2005 | Peacock | 341/51 |
| 6,975,253 B1 * | 12/2005 | Dominic | 341/65 |
| 6,982,661 B2 * | 1/2006 | Acharya et al. | 341/65 |
| 7,002,494 B2 * | 2/2006 | Singhal et al. | 341/79 |
| 7,058,965 B1 * | 6/2006 | Gordon et al. | 725/39 |
| 7,129,863 B1 * | 10/2006 | Mukhtar et al. | 341/79 |
| 7,129,864 B2 * | 10/2006 | Jahanghir et al. | 341/106 |
| 7,135,997 B2 * | 11/2006 | Oh | 341/106 |
| 7,203,869 B2 | 4/2007 | Gwak | |
| 7,353,233 B1 * | 4/2008 | Ganca | 1/1 |
| 7,358,870 B2 * | 4/2008 | Bay | 341/65 |
| 7,483,489 B2 * | 1/2009 | Gentric et al. | 375/240.26 |
| 7,715,475 B1 * | 5/2010 | Puri et al. | 375/240 |
| 7,783,685 B2 * | 8/2010 | Takashima et al. | 707/828 |
| 7,801,418 B2 * | 9/2010 | Takakuwa et al. | 386/241 |
| 8,331,455 B2 * | 12/2012 | Jang et al. | 375/240.24 |
| 8,711,946 B2 * | 4/2014 | Jang et al. | 375/240.25 |
| 8,774,285 B2 * | 7/2014 | Jang et al. | 375/240.25 |
| 2001/0033697 A1 | 10/2001 | Shimada | |
| 2001/0046260 A1 | 11/2001 | Molloy | |
| 2003/0156652 A1 | 8/2003 | Wise et al. | |
| 2003/0169816 A1 * | 9/2003 | Wang et al. | 375/240.12 |
| 2003/0182627 A1 * | 9/2003 | Chung et al. | 715/513 |
| 2004/0028141 A1 | 2/2004 | Hsiun et al. | |
| 2004/0230881 A1 | 11/2004 | Gwak | |
| 2005/0007264 A1 | 1/2005 | Hsiun | |
| 2005/0008240 A1 * | 1/2005 | Banerji et al. | 382/238 |
| 2005/0141621 A1 | 6/2005 | Seo | |
| 2006/0031281 A1 * | 2/2006 | Shen et al. | 709/201 |
| 2006/0235883 A1 * | 10/2006 | Krebs | 707/104.1 |

FOREIGN PATENT DOCUMENTS

| | | |
|---|---|---|
| EP | 1562383 A2 | 8/2005 |
| EP | 1599049 A2 | 11/2005 |
| JP | 2001-245296 A | 9/2001 |
| JP | 2003-259370 A | 9/2003 |
| KR | 2002-0097389 A | 12/2002 |
| KR | 10-2004-0098102 A | 11/2004 |
| KR | 10-2004-0098105 A | 11/2004 |
| KR | 10-2005-0065102 A | 6/2005 |
| KR | 10-2005-0066142 A | 6/2005 |
| WO | WO 2004036913 A1 * | 4/2004 |

OTHER PUBLICATIONS

MPEG, 1994, pp. 113-115 and 155-165.
Bailey et al., "Programmable Vision Processor/Controller", IEEE Micro, vol. 12, No. 5, Oct. 1, 1992, pp. 33-39, XP000330855.
Bose et al., "A Single Chip Multistandard Video Codec", IEEE 1993 Custom Integrated Circuits Conference, May 9-12, 1993, pp. 11.4.1-11.4.4, XP010222103.
Lee et al., "Data Flow Processor for Multi-Standard Video Codec", IEEE 1994 Custom Integrated Circuits Conference, May 1-4, 1994, pp. 103-106, XP010129914.

* cited by examiner

ENCODER AND DECODER

FIELD OF THE INVENTION

The present invention relates to an encoder and a decoder, and more particularly to an encoder and a decoder which can decode a bitstream regardless of a standard used for encoding the bitstream.

DISCUSSION OF THE RELATED ART

Generally, a moving image is converted into a type of bitstream by an encoder. At this time, the bitstream is stored in accordance with an encoding type satisfying conditions of the encoder.

MPEG standards require syntax, semantics, and order of the syntax as conditions of a bitstream.

The syntax indicates structures, types, and lengths of data and also indicates in what order data are expressed. That is, the syntax serves to establish grammar for encoding and decoding operations and defines an order of elements, lengths of the elements, and data types contained in the bitstream.

The semantics indicates the meanings of bits constituting data. That is, the semantics indicates what the respective elements of the bitstream mean.

Accordingly, various types of bitstreams may be created, depending on the encoding conditions of the encoder or employed standards (or codecs). In general, standards (for example, MPEG-1, MPEG-2, MPEG-4, and MPEG-4 AVC) have different types of bitstream syntax.

It can be said that the bitstreams encoded in accordance with the standards or encoding conditions have different types (that is, syntax and semantics). A decoder corresponding to an encoder should be used to decode a bitstream encoded by the encoder.

As described above, known bitstream decoders have a limitation that they should satisfy conditions of encoders. Such a limitation makes it difficult to embody a unified codec corresponding to a plurality of standards.

SUMMARY OF THE INVENTION

In order to solve the above-mentioned problems, the present invention suggests a bitstream encoding/decoding device and method which can decode bitstreams encoded in a variety of types (syntax, semantics) corresponding to a variety of standards (for example, MPEG-1, MPEG-2, MPEG-4, and MPEG-4 AVC) by use of the same information recognition method.

The present invention also suggests a bitstream encoding/decoding device and method which can perform a normal decoding operation regardless of change in syntax at the time of encoding a bitstream.

The present invention also suggests a bitstream encoding/decoding device and method which can manage various syntax structures of various standards with reference to similarity of semantics in a unified manner.

The present invention also suggests a decoder which can easily analyze bitstream syntax so as to decode various types of bitstreams with a unified codec and/or a general codec and a syntax analysis method for decoding the bitstreams.

The present invention also suggests a decoder which can commonly employ a syntax analysis method for decoding various types of bitstreams and a syntax analysis method for decoding the bitstreams.

The present invention also suggests a decoder which can allow elements used for decoding bitstreams to share element information of analyzed syntax (that is, information created by syntax element analysis) and a syntax analysis method for decoding the bitstreams.

The present invention also suggests a decoder which can use element information (that is, information created by syntax element analysis) for syntax element analysis of subsequent bitstreams and a syntax analysis method for decoding the bitstreams.

The present invention suggests international standardization of a concept and a structure for unified decoding of bitstreams. Other objects of the present invention can be more clearly understood from preferred embodiments described below.

According to an aspect of the invention, there is provided a decoder comprising: a condition information extracting unit creating recognition information using syntax tree information indicating a hierarchical structure between syntax elements corresponding to bits of an input bitstream, respectively and rule description information indicating connectivity between the syntax elements—where the syntax elements include group elements and information elements—; and a decoding unit decoding data contained in the bitstream into moving image data using the recognition information.

The syntax tree information may indicate a hierarchical dependence between a plurality of group elements and a plurality of information elements and the recognition information may include syntax information corresponding to the bits of the bitstream and semantics corresponding to the syntax information. Here, the syntax information may include at least one of a syntax order, a syntax length, and a syntax data type.

The connectivity expressed by the rule description information may include connectivity information and branch information between group elements and information elements. Here, the branch information may change an information element connected to a current information element depending on satisfaction of a predetermined condition.

The decoder may receive the rule description information and the bitstream independently or may receive a universal bitstream in which the rule description information and the bitstream are unified in one data.

The decoder may further receive at least one of the syntax tree information and standard information employed by the encoder having created the bitstream.

At least one of a syntax element included in the syntax tree information, a hierarchical relation between syntax elements, and semantics corresponding to the syntax elements may be added, deleted, or updated.

According to another aspect of the invention, there is provided an encoder comprising: an encoding unit encoding an input moving image into a bitstream in accordance with a predetermined standard; and a condition information creating unit creating rule information corresponding to syntax elements corresponding to bits of the bitstream and transmitting the rule information to the encoding unit—where the syntax elements include a plurality of group elements and a plurality of information elements and the rule information indicates connectivity between the group elements and the information elements—. Here, the encoding unit independently transmits the bitstream and the rule information to a decoder, or creates a universal bitstream in which the bitstream and the rule information are unified and transmits the universal bitstream to the decoder.

The condition information creating unit may store syntax tree information indicating a hierarchical dependence between the syntax elements and may create the rule information using information corresponding to the syntax elements of the bits among the syntax tree information.

The rule information may include connectivity information and branch information between the group elements and the information elements. Here, the branch information may change the information elements connected to a current information element depending on satisfaction of a predetermined condition.

The universal bitstream may be constructed in the order of the rule information, header information, and compressed data or in the order of header rule information, the header information, data rule information, and the compressed data.

The rule information may further include standard information employed by the encoder having created the universal bitstream.

At least one of a syntax element included in the syntax tree information, a hierarchical relation between syntax elements, and semantics corresponding to the syntax elements may be added, deleted, or updated.

According to another aspect of the invention, there is provided a decoder comprising: an element information storage unit storing information corresponding to bitstream syntax elements; a syntax analysis unit specifying an analysis order of the bitstream syntax elements included in a header area of an input bitstream using syntax rule information, creating a control signal and context information using syntax element information in the specified order of the syntax elements, and storing the control signal and context information in the element information storage unit; and a decoding unit decoding data included in the bitstream into moving image data using the control signal and context information.

The syntax analysis unit may create the control signal and context information and a corresponding value using the control signal and context information and then may store the created information in the element information storage unit.

The syntax rule information, the syntax element information, and the control signal and context information may be embodied by binary codes.

The syntax analysis unit may read out a proper control signal and context information from the control signal and context information stored in the element information storage unit and then may analyze a current syntax element.

According to another aspect of the invention, there is provided a bitstream decoding method of a decoder, the method comprising: receiving a bitstream; creating recognition information using syntax tree information indicating a hierarchical structure between syntax elements of the bitstream and rule description information indicating connectivity between the syntax elements—where the syntax elements include group elements and information elements—; and decoding data contained in the bitstream into moving image data using the recognition information.

The syntax tree information may indicate a hierarchical dependence between a plurality of group elements and a plurality of information elements and the recognition information may include syntax information corresponding to the bits of the bitstream and semantics corresponding to the syntax information. Here, the syntax information may include at least one of a syntax order, a syntax length, and a syntax data type.

The connectivity expressed by the rule description information may include connectivity information and branch information between group elements and information elements. Here, the branch information may change an information element connected to a current information element depending on satisfaction of a predetermined condition.

The decoder may receive the rule description information and the bitstream independently or may receive a universal bitstream in which the rule description information and the bitstream are unified in one data.

According to another aspect of the invention, there is provided a bitstream creating method in an encoder, the method comprising the steps of: encoding an input moving image into a bitstream in accordance with a predetermined standard; creating rule information corresponding to syntax elements corresponding to bits of the bitstream—where the syntax elements include a plurality of group elements and a plurality of information elements and the rule information indicates connectivity between the group elements and the information elements—; and transmitting the bitstream and the rule information to a decoder.

The transmitting step may include the steps of: creating a universal bitstream in which the bitstream and the rule information are unified; and transmitting the universal bitstream to the decoder through a communication network.

The universal bitstream may be constructed in the order of the rule information, head information, and compressed data or in the order of header rule information, the head information, data rule information, and the compressed data.

DETAILED DESCRIPTION OF EMBODIMENTS OF THE INVENTION

Figure 1:
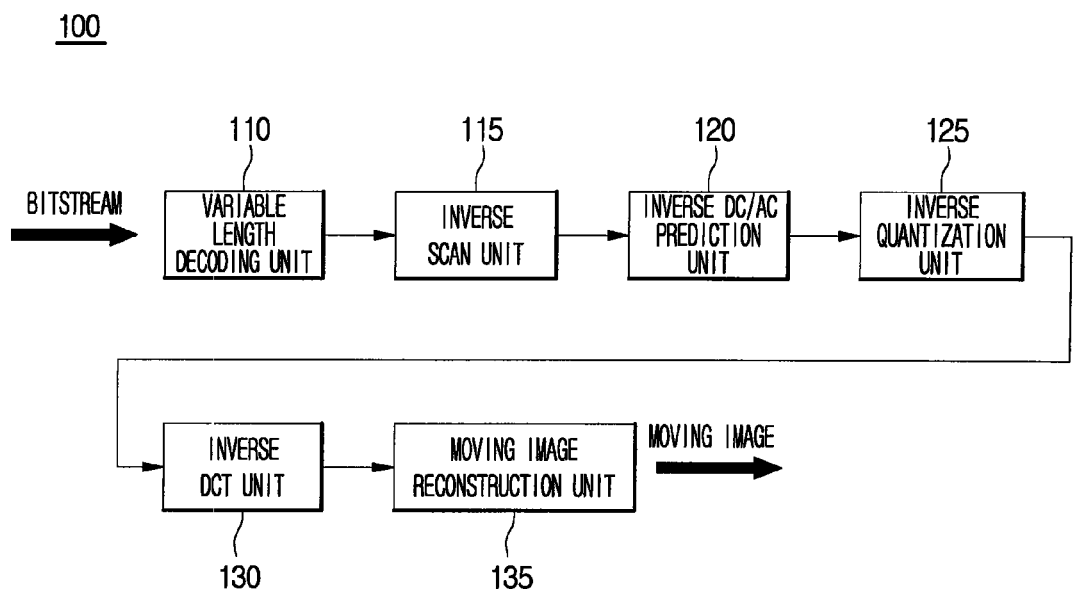
FIG. 1 is a diagram schematically illustrating a configuration of a known decoder.

The above objects, features and advantages will become more apparent through the below description with reference to the accompanying drawings.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, preferred embodiments will be described in detail with reference to the accompanying drawings. Identical or corresponding elements will be given the same reference numerals, regardless of the figure number, and any redundant description of the identical or corresponding elements will not be repeated.

Known Decoder and Encoder

Figure 2:
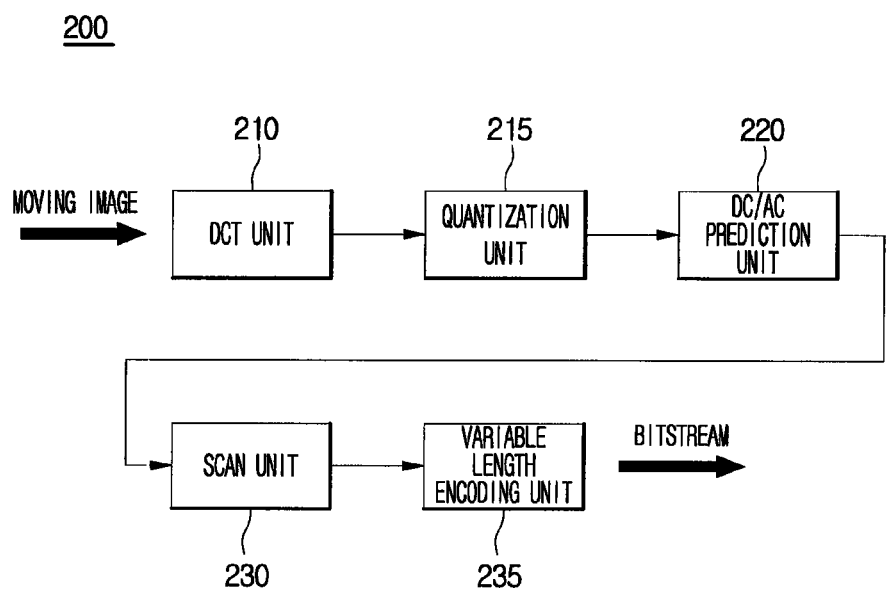
FIG. 2 is a diagram schematically illustrating a configuration of a known encoder.

FIG. 1 is a diagram schematically illustrating a configuration of a known decoder and FIG. 2 is a diagram schematically illustrating a configuration of a known encoder.

As shown in FIG. 1, an MPEG-4 decoder 100 generally includes a variable length decoding unit 110, an inverse scan unit 115, an inverse DC/AC prediction unit 120, an inverse quantization unit 125, an inverse discrete cosine transform (inverse DCT) unit 130, and a moving image reconstruction (VOP (Video Object Plane) reconstruction) unit 135. It is obvious that the configuration of the decoder 100 is different depending on employed standards and some elements may be replaced with other elements.

When an input bitstream is subjected to a syntax parsing operation and image data except a header are extracted, the variable length decoding unit 110 creates quantized DCT coefficients using a Huffman table, and the inverse scan unit 115 performs an inverse scan operation to create data having the same order of the moving image. That is, the inverse scan unit 115 outputs values in the inverse order of the order in which the values are scanned at the time of encoding. A scan direction may be defined in accordance with a distribution of values in the frequency domain after performing the quantization operation at the time of encoding. Generally, a zigzag scan method is used, but various types of scan methods may be used depending on the codec.

The syntax parsing operation may be performed in a unified manner by the variable length decoding unit 110 or by any element for performing a bitstream prior to the variable length decoding unit 110. In this case, since the same standard is employed by the encoder and the decoder, the syntax parsing operation is performed using only a predetermined reference so as to correspond to the corresponding standard.

The inverse DC/AC prediction unit 120 determines the directionality of a reference block for prediction using the magnitudes of the DCT coefficients in the frequency domain.

The inverse quantization unit 125 inversely quantizes the inversely scanned data. That is, the inverse quantization unit 125 reconstructs DC and AC coefficients using a quantization parameter specified at the time of encoding.

The inverse DCT unit 130 performs an inverse DCT operation and acquires pixel values of an actual moving image to create a video object plane (VOP). The moving image reconstruction unit 135 reconstructs and outputs moving image signals using the VOP created by the inverse DCT unit 130.

As shown in FIG. 2, an MPEG-4 encoder 200 generally includes a DCT unit 210, a quantization unit 215, a DC/AC prediction unit 220, a scan unit 230, and a variable length encoding unit 235.

Elements of the encoder 200 perform the inverse functions of the elements of the decoder 100, respectively, which is obvious to those skilled in the art. In brief, the encoder 200 transforms moving image signals (that is, pixel values of a digital image) into frequency values through a DCT operation, a quantization operation, and the like, performs an encoding to the frequency values, performs a variable encoding operation of differentiating the lengths of bits in accordance with the frequency of information, and then outputs a compressed bitstream.

Decoder According to a Preferred Embodiment of the Present Invention

Figure 3:
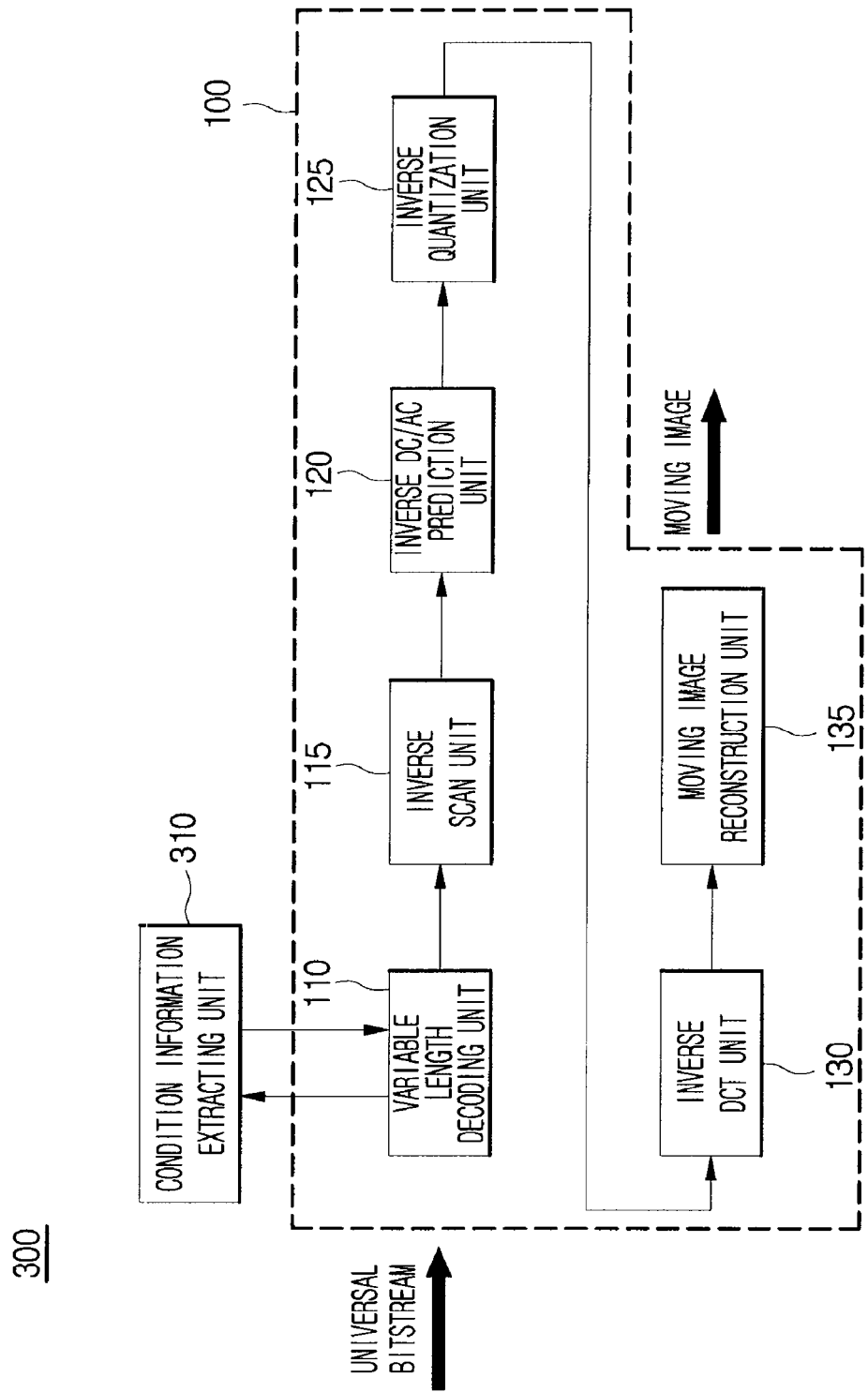
FIG. 3 is a diagram schematically illustrating a configuration of a decoder according to a preferred embodiment of the present invention.
Figure 4:
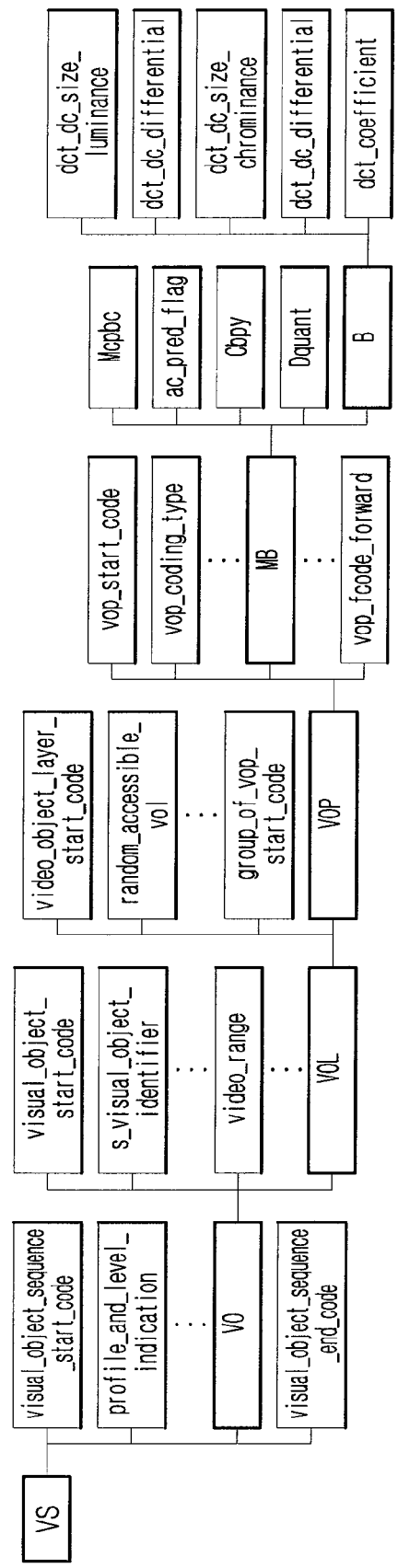
FIG. 4 is a diagram illustrating a syntax tree according to a preferred embodiment of the present invention.

FIG. 3 is a diagram schematically illustrating a configuration of a decoder according to a preferred embodiment of the present invention, and FIG. 4 is a diagram illustrating a syntax tree according to a preferred embodiment of the present invention.

As shown in FIG. 3, the decoder 300 according to a preferred embodiment of the present invention further includes a condition information extracting unit 310 in addition to the known decoder 100 (hereinafter, referred to as a "decoding unit"). The illustrated configuration of the decoding unit 100 is an example. Any configuration may be employed if only it can reconstruct an input bitstream into a moving image, and the configuration may be variously modified depending on the employed standards.

The condition information extracting unit 310 may be dependently coupled to the variable length decoding unit 110 as shown in FIG. 3, may be inserted into the variable length decoding unit 110, or may be disposed at a front stage of the variable length decoding unit 110. For example, the condition information extracting unit 310 may be embodied as a finite state machine (FSM). The variable length decoding unit 110 in this description indicates only an element (for example, a parsing unit) for parsing a bitstream in the decoder 300, but the scope of the invention is not limited due to it.

The condition information extracting unit 310 recognizes syntax information (that is, syntax order, syntax length, data type, and the like) and semantics corresponding to the syntax information using rule information extracted from the universal bitstream and a syntax tree previously stored and supplies the recognized information to the variable length decoding unit 110. The universal bitstream is created by an encoder 600 (see FIG. 6) so as to include a bitstream created by the known encoder 200 and the rule information. Of course, when the rule information is created as an independent electronic file (or data) by the encoder 600 according to a preferred embodiment of the present invention and is supplied to the decoder 300, it is obvious that the bitstream can be encoded in the known bitstream type having only general header information and compressed data. However, in this embodiment, it is assumed that the encoder 600 creates one universal bitstream using the rule information and the bitstream and the decoder 300 decodes the compressed data included in the bitstream using the rule information included in the universal bitstream.

The rule information is inserted into or added to any area of the known bitstream to form a universal bitstream. Preferably, the rule information is disposed in front of the header information of the known bitstream. The rule information can include standard information (for example, MPEG-1, MPEG-2, MPEG-4, and MPEG-4 AVC) employed at the time of creating the bitstream in the encoder 600, rule description information (see FIG. 5 and Table 2) with a predetermined type (for example, text type or binary code type).

When the condition information extracting unit 310 is subordinated to the variable length decoding unit 110, as shown in FIG. 3, the variable length decoding unit 110 extracts the rule information from the received universal bitstream and supplies the extracted rule information to the condition information extracting unit 310. Subsequently, when the recognition information (that is, syntax information and semantics) is received from the condition information extracting unit 310, the variable length decoding unit 110 performs the parsing operation to correspond to the recognition information. This is true of the case where the variable length decoding unit 110 includes the condition information extracting unit 310.

When the condition information extracting unit 310 is located at the front stage of the variable length decoding unit 110, the condition information extracting unit 310 extracts the rule information from the universal bitstream, creates the recognition information, and then supplies the recognition information and the bitstream to the variable length decoding unit 110.

The condition information extracting unit 310 can be embodied in a variety of forms in which it is disposed in parallel to the variable length decoding unit 110 or the like. When the variable length decoding unit 110 can be supplied with the recognition information from the condition information extracting unit 310, the same is true without any restriction.

The condition information extracting unit 310 according to a preferred embodiment of the present invention will be described specifically below.

The condition information extracting unit 310 can include a condition information storage section (not shown) and a recognition section (not shown).

The condition information storage section stores a syntax tree with a predetermined structure. The syntax tree includes group elements indicating layers and information elements constituting the corresponding group, as shown in FIG. 4. In the case of MPEG-4, examples of the group elements can include VS (Visual Session), VO (Visual Object), VOL (Video Object Layer), VOP (Video Object Plane), MB (Macro Block), and B (Block). Examples of the information elements can include "visual_object_sequence_start_code" and "user_data." Information such as the number of bits, actual content (syntax value), and semantics corresponding to the relevant information element in the bitstream is recorded in the information element. The group elements and the information elements can be distinguished from each other by the corresponding indexes and the indexes can be used as identifiers in the universal bitstream. The information elements included in one group element can be distinguished from each other by hierarchical indexes.

The syntax tree can be created in consideration of similar points and different points of the syntax elements (that is, group elements and/or information elements) used in the standards. For example, the element, "sequence_header_code", in MPEG-2 is a code indicating a start portion of a moving image, similarly to "visual_object_start_code" in MPEG-4. Accordingly, both can be considered as one information element though both are different standards. However, codes that are different between the standards can be managed individually. That is, the syntax tree used for encoding/decoding the universal bitstream can be said to be a union set of syntax elements of the standards (for example, MPEG-1, MPEG-2, MPEG-4, and MPEG-4 AVC).

Even when the semantics between the syntax elements used in the standards are similar to each other and thus the syntax elements are considered as one information element but have different features, they are preferably managed individually. For example, the number of bits, syntax values, semantics, and the like of a bitstream may be different depending on the standards.

The details of the elements included in the syntax tree are shown in Table 1. Here, Table 1 shows only elements necessary for MPEG-4 intra-only encoding/decoding operations, and thus it is obvious that elements corresponding to other standards (for example, MPEG-1, MPEG-2, and MPEG-4 AVC) can be additionally included therein.

TABLE 1

Syntax Table

| Syntax Element | | | | MPEG-4 | | |
|---|---|---|---|---|---|---|
| Group Element | Element | Index | Hierarchical Index | Number of Bits | Syntax value | Semantics |
| VS | | 0 | | | | |
| VO | | 1 | | | | |
| VOL | | 2 | | | | |
| VOP | | 3 | | | | |
| MB | | 4 | | | | |
| B | | 5 | | | | |
| VS | visual_object_sequence_start_code | 6 | 0.1 | 32 | | VS Start Code |

TABLE 1-continued

Syntax Table

| Syntax Element | | | | MPEG-4 | | |
|---|---|---|---|---|---|---|
| Group Element | Element | Index | Hierarchical Index | Number of Bits | Syntax value | Semantics |
| VS | profile_and_level_indication | 7 | 0.2 | 8 | | |
| VS | user_data_start_code | 8 | 0.3 | 32 | | |
| VS | user_data | 9 | 0.4 | 8 | | |
| VS | VO | 1 | 0.5 | | | VO (loops) |
| VS | visual_object_sequence_end_code | 10 | 0.6 | 32 | | VS End Code |
| VO | visual_object_start_code | 11 | 0.5.1 | 32 | | VO Start Code |
| ... | ... | ... | ... | ... | ... | ... |
| VO | VOL | 2 | 0.5.14 | | | VOL (loops) |
| VOL | video_object_layer_start_code | 24 | 0.5.14.1 | 32 | | VOL Start Code |
| ... | ... | ... | ... | ... | ... | ... |
| VOL | VOP | 3 | 0.5.14.27 | | | VOP (loops) |
| VOP | vop_start_code | 50 | 0.5.14.27.1 | 32 | | VOP Start Code |
| ... | ... | ... | ... | ... | ... | ... |
| VOP | MB | 4 | 0.5.14.27.11 | | | MB (loops) |
| MB | Mcpbc | 70 | 0.5.14.27.11.1 | (1~9) | | |
| ... | ... | ... | ... | ... | ... | ... |
| MB | B | 5 | 0.5.14.27.11.5 | | | B (loops) |
| B | dct_dc_size_luminance | 74 | 0.5.14.31.12.5.1 | (2~11) | | |
| ... | ... | ... | ... | ... | ... | ... |

As shown in Table 1, the elements included in the syntax tree can correspond to the indexes as identifiers in the universal bitstream and the elements can correspond to hierarchical indexes as identifiers in the groups, the number of bits in the bitstream, the syntax values, and the semantics.

The universal bitstream may be individually created by the encoders corresponding to the standards. Accordingly, the encoders may have syntax trees for creating rule information included in the universal bitstream. In this case, the syntax trees can include syntax elements of all applicable standards. Of course, the encoders 600 may have only the syntax tree of an employed standard and the syntax elements corresponding to other standards may be omitted.

It is obvious that the syntax elements included in the syntax tree, a hierarchical relation between the syntax elements, and the semantics corresponding to the syntax elements can be added, modified, or deleted due to variation, addition, and the like of standards.

The recognition section of the condition information extracting unit 310 creates recognition information using the rule information (rule description information) extracted from the universal bitstream or supplied from the parsing unit (for example, the variable length decoding unit 110) and the syntax tree stored in the storage section and then sends the created recognition information to the parsing unit. The recognition information includes the syntax information (that is, syntax order, syntax length, data type, and the like) and the semantics corresponding to the syntax information.

Generally, the bitstream created by an encoder 600 corresponding to a standard (for example, MPEG-1, MPEG-2, MPEG-4, and MPEG-4 AVC) includes only information necessary for the standard. Accordingly, there is a restriction that only the decoder corresponding to the standard can reconstruct the bitstream into a moving image. However, the encoder 600 according to a preferred embodiment of the present invention extracts information necessary for the corresponding standard from the syntax tree previously stored and creates a universal bitstream including the created rule information. The decoder 300 according to a preferred embodiment of the present invention can reconstruct the bitstream into a moving image regardless of the standards employed by the encoder by use of the rule information included in the universal bitstream.

The rule description information includes connectivity information between the elements in the bitstream and branch information which are expressed by the indexes of the syntax tree corresponding to the syntax elements. The connectivity information is information on continuous connections between the group elements and/or information elements, and the branch information is information on discontinuous connections (for example, configuration change of information elements and change in group elements) between the information elements depending on the satisfaction of a certain condition. The rule information can be included in the universal bitstream, for example, in a text type or a binary code type.

Figure 5:
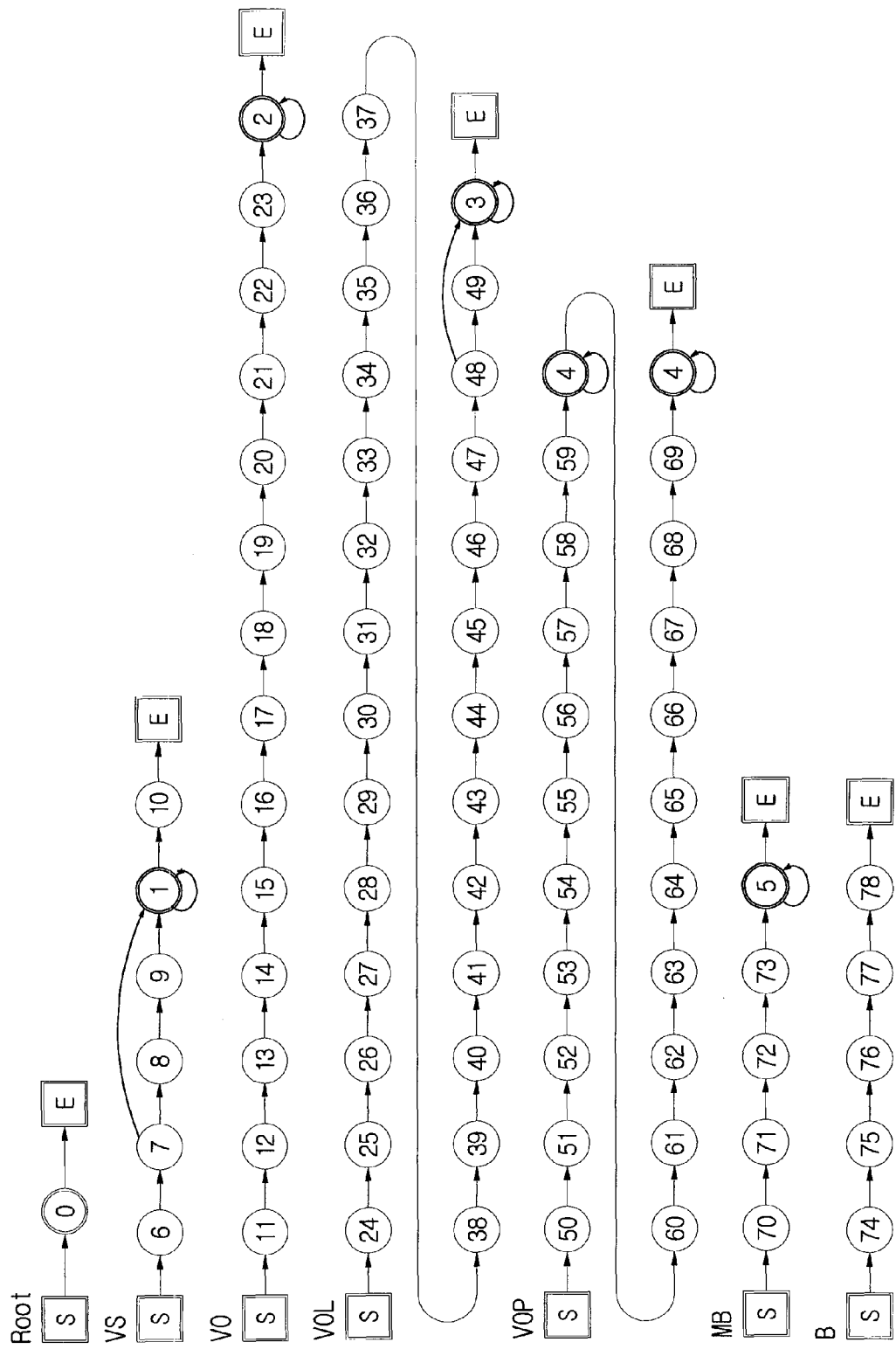
FIG. 5 is a diagram illustrating a rule of group elements in a graph according to a preferred embodiment of the present invention.

FIG. 5 is a diagram illustrating a rule of group elements in a graph. Texture description of the rule is shown in Table 2. The numerals marked in FIG. 5 and Table 2 are the indexes in Table 1.

As shown in FIG. 5, the information elements included in the respective group elements are arranged in a predetermined relation. That is, rule information corresponding to a standard can be constructed by combining rule information of the hierarchical group elements on the basis of the hierarchical structure of the bitstream. For example, in the case of MPEG-4, the group elements can be arranged in the order of root, VS, VO, VOL, VOP, MB, and B. Here, the "root" is used for all standards in the same way and indicates a start portion. The group element VS can construct the bitstream in the information element order of 6→7→8→9→1→10. The connectivity information is expressed in the form of (current node, subsequent node), which always starts at an S (start) node, goes via the successive information elements, and ends at an E (end) node. Referring to the rule of group element VS shown in FIG. 5, two branches exist. The information element "7" can be branched into the information element "8" and the information element "1" depending on the conditions. The information element "1" can be branched into the information element "1" and the information element "10." Here, the information element "1" indicates a different group element (that is, VO) as shown in Table 1 and most of the group elements have a loop structure. For example, this is because one moving image has a feature that several sheets of images are continuously expressed.

Table 2 shows the texture description of the rule shown in the form of graph in FIG. 5. That is, the connectivity information and the branch information are recorded in texture description (TD). In the universal bitstream, a predetermined type of information (for example, rule description information in the form of text or rule description information in the form of binary code) can be included at a position.

TABLE 2

| Texture Description | |
|---|---|
| Group Element | Rule Information |
| Root | Root |
| | connectivity (S, 0), (0,E) |
| VS | VS |
| | connectivity |
| | (S, 6), (6, 7), (7, 8), (7, 1), (8, 9), (9, 1), (1, 1), (1, E) |
| | branch next bits (32) == user_data_start_code, case1(8), case2(1) |
| | branch VO loop, case1(1), case2(E) |
| VO | VO |
| | connectivity |
| | (S, 11), (11, 12), (12, 13), (13, 14), (14, 15), (15, 16), (16, 17), (17, 18), |
| | (18, 19), (19, 20), (20, 21), (21, 22), (22, 23), (23, 2), (2, 2), (2, E) |
| | branch VOL loop, case1(2), case2(E) |
| VOL | VOL |
| | connectivity |
| | (S, 24), (24, 25), (25, 26), (26, 27), (27, 28), (28, 29), (29, 30), (30, 31), |
| | (31, 32), (32, 33), (33, 34), (34, 35), (35, 36), (36, 37), (37, 38), (38, 39), |
| | (39, 40), (41, 42), (42, 43), (43, 44), (44, 45), (45, 46), (46, 47), (47, 48), |
| | (48, 49), (49, 3), (3, 3) (3, E) |
| | branch VOP loop, case1(3), case2(E) |
| VOP | VOP |
| | connectivity |
| | (S, 50), (50, 51), (51, 52), (52, 53), (53, 54), (54, 55), (55, 56), (56, 57), |
| | (57, 58), (58, 59), (59, 4), (4, 4), (4, 60), (60, 61), (61, 62), (62, 63), (63, 64), |
| | (64, 65), (65, 66), (66, 67), (67, 68), (68, 69), (69, 4), (4, 4), (4, E) |
| | branch MB loop, case1(4), case2(60) |
| | branch MB loop, case1(4), case2(E) |
| MB | MB |
| | connectivity |
| | (S, 70), (70, 71), (71, 72), (72, 73), (73, 5), (5, 5), (5, E) |
| | branch B loop, case1(5), case2(E) |
| B | B |
| | connectivity |
| | (S, 74), (74, 75), (75, 76), (76, 77), (77, 78), (78, E) |

As described above, the connectivity information always starts at an S (start) node, goes via the successive information elements, and ends at an E (end) node. As shown in Table 2, when the rule of the group element "VS" is expressed in text, the branch information of the information element "7" and the information element "1" can be described in an input portion corresponding to the condition and a destination information element branched depending on an input condition. The input condition is judged at the information elements (for example, (7,8) and (7,1), (1,1) and (1,E), and the like in the case of VS) where two or more current nodes of the connectivity information are positioned. The branch information is sequentially used in the order of information elements where two or more current nodes are located. For example, the branch information on the information element "7" is "branch next bits (32)=user_data_start_code, case1(8), case2(1)", which is branched to the information element (8) when the subsequent 32 bits are "user_data_start_code" and is branched to the information element "1" otherwise. Similarly, the branch information on the information element "1" is "branch VO loop, case1(1), case2(E)." The number of case( ) included in the branch information can be equal to the number of branches.

The recognition section can create the recognition information (that is, syntax information (such as syntax order, syntax length, and data type) and semantics corresponding to the syntax information) using the rule information (or rule description information) (or received independently of the bitstream) included in the universal bitstream and the syntax tree previously stored (or included in the universal bitstream). The created recognition information is supplied to the parsing unit, thereby parsing the bitstream. The recognition information can further include standard information (for example, MPEG-1, MPEG-2, MPEG-4, and MPEG-4 AVC) employed at the time of creating the bitstream. When the decoder 300 according to a preferred embodiment of the present invention includes elements for decoding the bitstream corresponding to the standards individually or in parallel, a decoding path of a bitstream (that is, selection path of sequential elements) can be determined using the standard information included in the recognition information.

Encoder According to a Preferred Embodiment of the Present Invention

Figure 6:
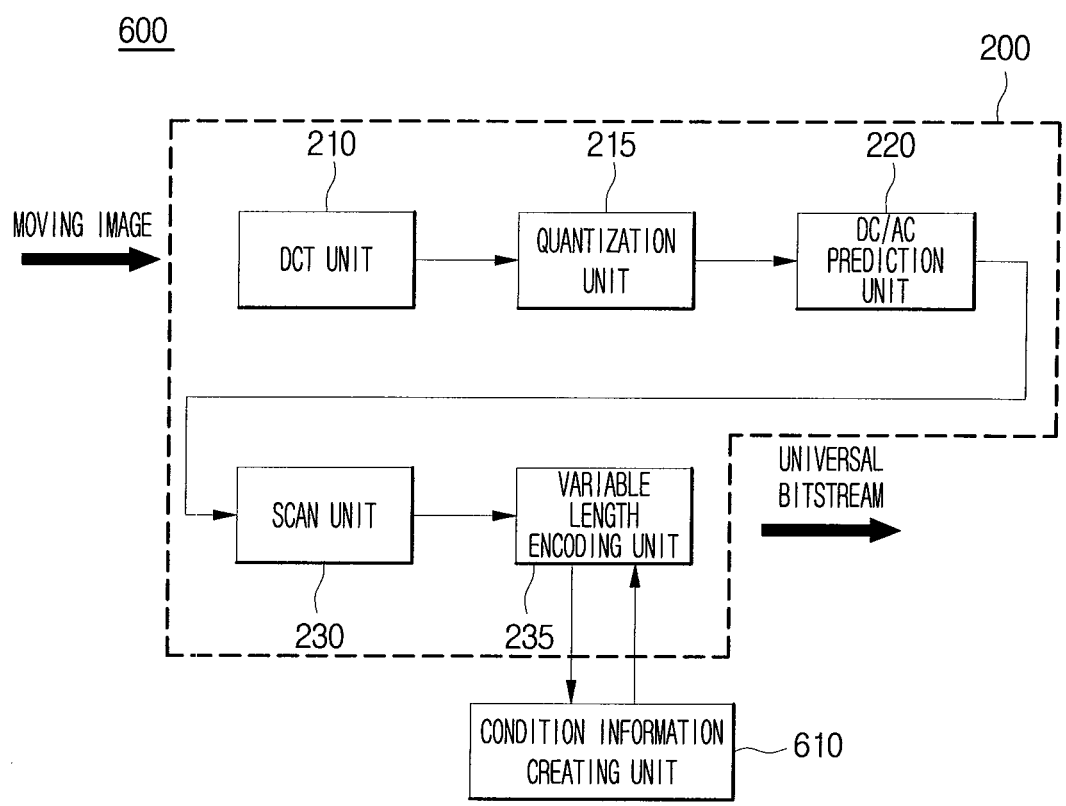
FIG. 6 is a diagram schematically illustrating a configuration of an encoder according to a preferred embodiment of the present invention.

FIG. 6 is a diagram schematically illustrating a configuration of an encoder according to a preferred embodiment of the present invention.

As shown in FIG. 6, the encoder 600 according to a preferred embodiment of the invention further includes a condition information creating unit 610, in addition to the elements of the known encoder 200 (hereinafter, referred to as an "encoding unit"). The illustrated configuration of the encoder 600 is only an example. Any configuration may be employed if only it can encode an input moving image into a bitstream and the configuration may be variously modified depending on the employed standards.

The condition information creating unit 610 may be dependently coupled to the variable length encoding unit 235 as shown in FIG. 6, may be inserted into the variable length encoding unit 235, or may be disposed at a rear stage of the variable length encoding unit 235. Of course, it is obvious that the condition information creating unit 610 can be additionally provided at the most front stage where the encoding operation starts in order to create the rule information on the header portion of the bitstream. For example, the condition information creating unit 610 may be embodied as a finite state machine (FSM). The variable length encoding unit 235 in this description indicates only an element (for example, an encoding unit) for finally performing an encoding operation to create a bitstream in the encoder 600, but the scope of the invention is not limited by it.

The condition information creating unit 610 includes a storage section storing the syntax tree so as to create the rule information of (or corresponding to) the universal bitstream and a creation section creating the rule information corresponding to the bits at the time of creating a bitstream using the syntax tree. The rule information can include syntax information (such as syntax order, syntax length, and data type) and semantics corresponding to the syntax information. The rule information can further include standard information employed for creating the bitstream in the encoder 600. When the rule information is previously specified to correspond to the respective encoders 600, it is obvious that the rule information is not created independently, but the pre-specified rule information can be used.

The encoding unit (for example, the variable length encoding unit 235) creates a universal bitstream in which the rule information (and the standard information) supplied from the condition information creating unit 610 is included in a predetermined area thereof. The universal bitstream can be constructed in the order of the rule information, header information, and data or in the order of header rule information, header information, data rule information, and data. As described above, it is also obvious that the encoder 600 according to a preferred embodiment of the present invention can encode a bitstream in the form of a known bitstream having only general header information and compressed data by managing the rule information in the form of an independent electronic file (or data). The encoding unit can allow the syntax tree stored in the storage section to be inserted into the universal bitstream. When the syntax tree is inserted into the universal bitstream, the decoder 300 can reconstruct the universal bitstream into a moving image without separately having the syntax tree.

The method of creating the rule information corresponding to the bits of the bitstream using the previously stored syntax tree in the encoder 600 can be easily understood by those skilled in the art on the basis of the method of creating the recognition information using the syntax tree in the decoder 300, and thus description thereof will be omitted.

As described above, the universal bitstream encoding/decoding methods according to a preferred embodiment of the present invention can facilitate the change of syntax in a standard or between different standards (or codecs). That is, it is possible to change the syntax order, to insert new syntax, or to delete existing syntax in a bitstream created in accordance with a specific standard.

However, according to the prior art, there was a problem that the decoder could not decode normally a bitstream at the time of changing syntax. For example, when a bitstream having information of ABC is changed to have information of ACB, the decoder cannot recognize the change and cannot decode the bitstream normally. The same problem occurs when F is newly inserted to form bitstream information of ABFC or when B is deleted to form bitstream information of AC.

However, in the universal bitstream encoding/decoding method and device according to a preferred embodiment of the present invention, since the rule information of the corresponding bitstream is included in the universal bitstream, the condition information extracting unit 310 creates the recognition information using the syntax tree, and the bitstream is parsed using the recognition information, a smooth decoding operation can be performed even in the above-mentioned cases.

Figure 7:
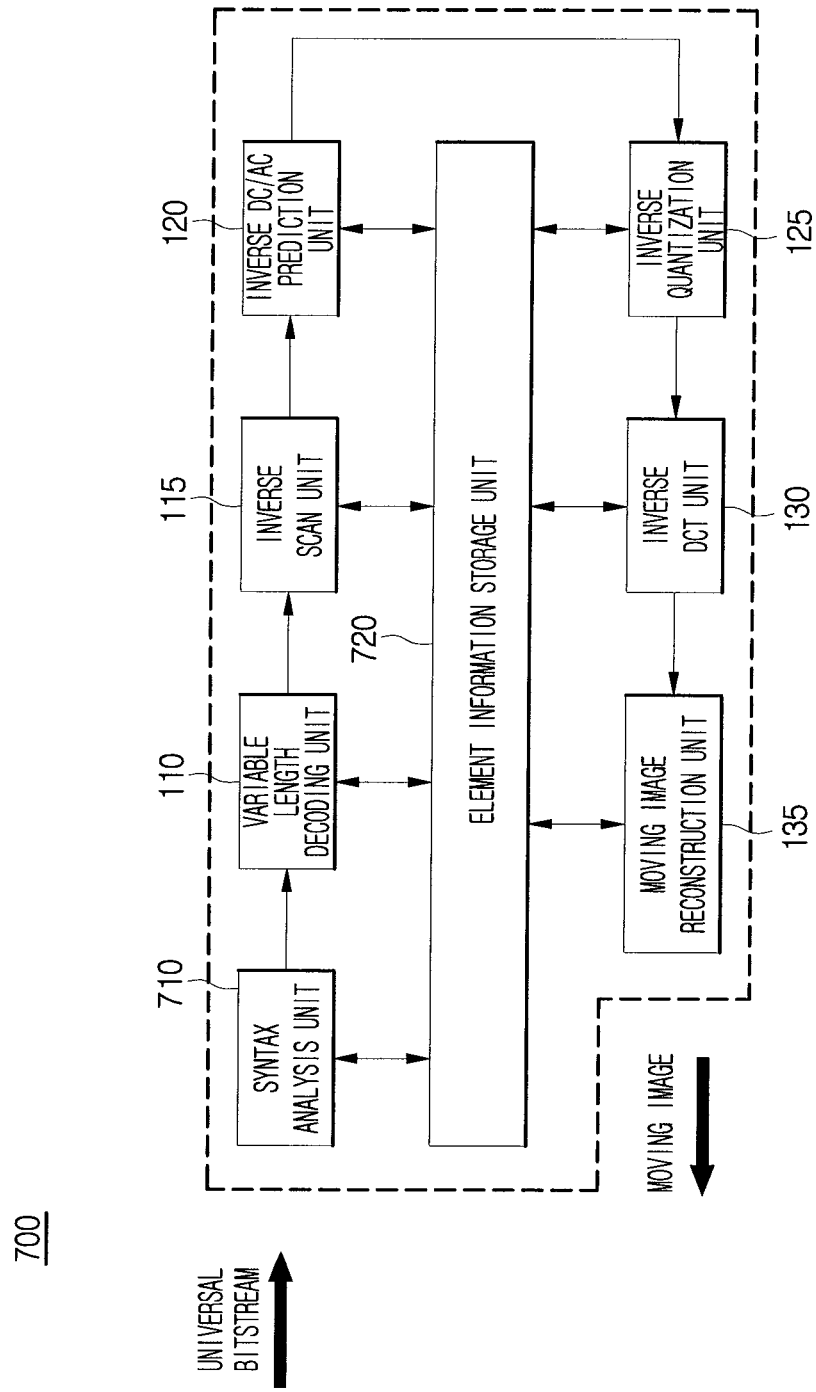
FIG. 7 is a diagram schematically illustrating a configuration of a decoder according to another preferred embodiment of the present invention.
Figure 8:
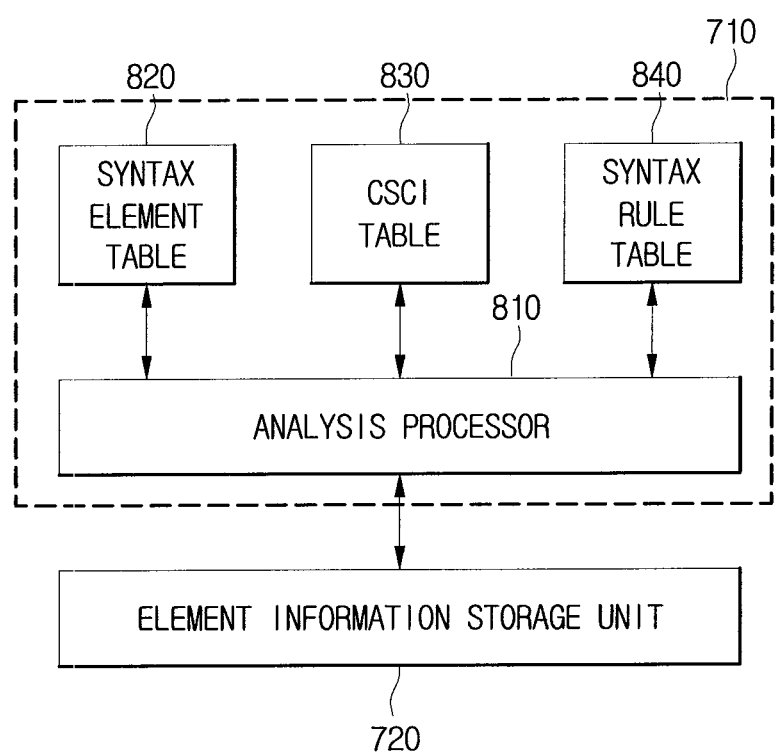
FIG. 8 is a diagram schematically illustrating a configuration of a syntax analysis unit according to another preferred embodiment of the present invention.
Figure 9:
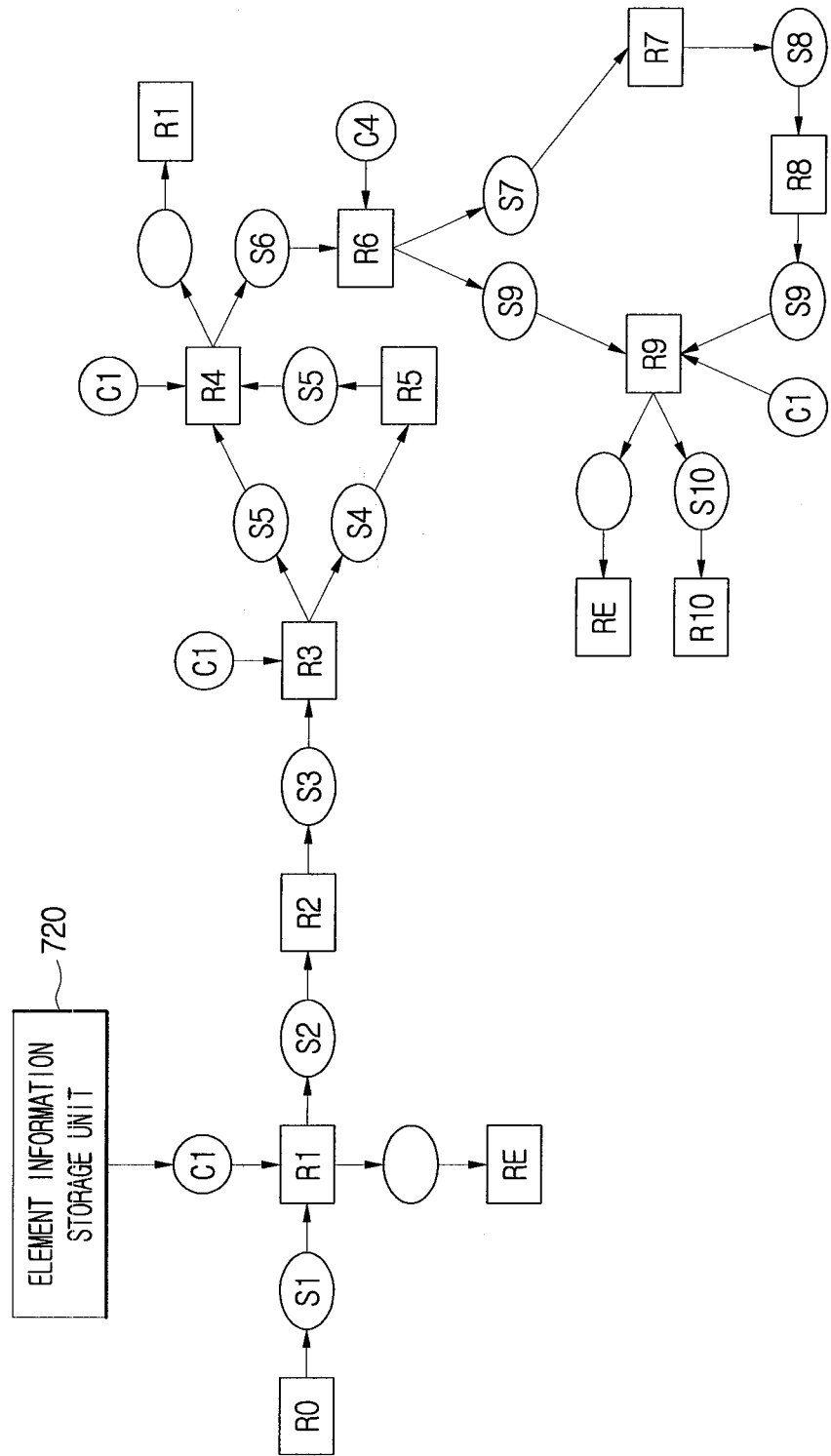
FIG. 9 is a diagram illustrating a syntax analysis process according to another preferred embodiment of the present invention.

Decoder and Syntax Analysis Method According to Another Embodiment of the Invention FIG. 7 is a diagram schematically illustrating a configuration of a decoder according to another preferred embodiment of the present invention; FIG. 8 is a diagram schematically illustrating a configuration of a syntax analysis unit according to another preferred embodiment of the present invention; and FIG. 9 is a diagram illustrating a syntax analysis process according to another preferred embodiment of the present invention.

As shown in FIG. 7, the decoder 700 according to the present invention further comprises a syntax analysis unit 710 in addition to the configuration of the known decoder 100 (hereinafter, referred to as a "decoding unit"). The decoder 700 can further include an element information storage unit 720.

The illustrated configuration of the decoder 700 is only an example. Any configuration may be employed if only it can reconstruct an input bitstream into a moving image, and the configuration may be variously modified depending on employed standards. The known decoding unit 100 can further include an element for parsing syntax, but many differences exist in the course of processing the syntax between both. The differences can be easily understood from the following description.

The syntax analysis unit 710 may be provided in front of the variable length decoding unit 110, as shown in FIG. 7. In this case, the variable length decoding unit 110 can use the element information analyzed/created by the syntax analysis unit 710 when reading data of a specific length range as information included in the header area of the bitstream, performing a Huffman decoding operation, and creating semantic data.

Of course, the syntax analysis unit 710 may be inserted into the variable length decoding unit 110 or may be coupled in parallel to the variable length decoding unit 110. The syntax analysis unit 710 coupled in parallel to the variable length decoding unit 110 should be supplied with the bitstream (or information of the header area) received by the variable length decoding unit 110, in order to analyze/create the element information and store the element information in the element information storage unit 720.

The Syntax analysis unit 710 may be embodied by the finite state machine (FSM).

The syntax analysis unit 710 sequentially analyzes the element information (for example, order of syntax elements, length of syntax elements, syntax type of syntax elements, correlation between syntax elements, and ranges of other elements using the syntax elements) corresponding to the syntax elements by using the syntax rule information extracted from the universal bitstream, a syntax element table previously stored, and a control signal/context information table, and then stores the analyzed element information in the element information storage unit 720. That is, the element information includes SET output values and CSCIT output values to be described later.

The variable length decoding unit 110 can use the element information stored in the element information storage unit 720 to create semantics data.

In another method, the syntax analysis unit 710 may transmit the analyzed element information to the variable length decoding unit 110, entropically decode the corresponding element information as needed, and store the decoded element information in the element information storage unit 720.

In this way, the main body storing the element information in the element information storage unit 720 may be the syntax analysis unit 710 or the variable length decoding unit 110 and may be specified depending on the convenience of design or implement. The main body storing the element information may be the syntax analysis unit 710 and the variable length decoding unit 110, and the types of the element information stored in the respective units may be specified differently from each other. This is true of the following description.

In this description, the universal bitstream means a bitstream further including a syntax rule table in an area in addition to a general bitstream created by the known encoder 200. The syntax rule information is inserted into or added to an area of the general bitstream to form a universal bitstream. Preferably, the rule information is provided at the stage in front of the header information in the general bitstream.

It is obvious that the universal bitstream can further include at least one of the syntax element table and the control signal/context information table, in addition to the syntax rule table. However, when the universal bitstream does not include at least one of the syntax element table and the control signal/context information table, the decoder 700 or the syntax analysis unit 710 should include them.

The syntax rule table, the syntax element table, and the control signal/context information table are illustrated and described in the form of a table for the purpose of convenience, but the information may be sequentially arranged and displayed in practice.

For example, the syntax rule table, the syntax element table, and the control signal/context information table may be information shown and/or described in the form of a binary code. Accordingly, it is possible to simplify the expression of the information and to simplify the expression of the processes (see FIG. 4) of the syntax element table, thereby simplifying implement and compiling thereof. Bitstreams of various standards can be parsed using a syntax parsing function.

The decoder 700 according to a preferred embodiment of the present invention may receive a universal bitstream from an encoder and decode moving image data included in the universal bitstream, or may receive only the bitstream from the encoder. In this case, the decoder 700 should receive the syntax rule information (and at least one of the syntax element table and the control signal/context information table) from the encoder in the form of additional data or an electronic file.

In this embodiment of the invention, it is assumed that an encoder 1000 creates one universal bitstream using the syntax rule information and a bitstream, and a decoder 700 decodes compressed data included in the bitstream using the rule information included in the universal bitstream.

When the syntax analysis unit 710 is disposed at the front stage of the variable length decoding unit 110 as shown in FIG. 7, the variable length decoding unit 110 can create the semantics data from the input bitstream using the element information stored in the element information storage unit 720. The variable length decoding unit 110 may entropically decode the element information received from the syntax analysis unit 710 as needed and may store the element information in the element information storage unit 720, as described above.

The configuration of the syntax analysis unit 710 is schematically illustrated in FIG. 8.

As shown in FIG. 8, the syntax analysis unit 710 includes an analysis processor. The analysis processor 810 analyzes the syntax elements included in the header area of the bitstream using a syntax element table 820, a CSCI (Control Signal/Context Information) table 830, and a syntax rule table 840, extracts or creates the element information, and then stores the element information in the element information storage unit 720. As described above, the analysis processor 810 may transmit the extracted or created element information (for example, analyzed values) to the variable length decoding unit 110, and the variable length decoding unit 110 may convert the received element information into semantics data and store the semantics data in the element information storage unit 720.

The syntax element table 820 and the CSCI table 830 may be disposed in the syntax analysis unit 710. For example, when the syntax analysis unit 710 is embodied by a combination of program codes, information corresponding to the syntax element table 820 and the CSCI table 830 may be together included.

The syntax element table 820 and the CSCI table 830 may be referred to by the analysis processor 810 at the time of syntax analysis in a state where they are stored in an addition storage unit.

Similarly, the syntax rule table 840 included in the universal bitstream or received as additional data can be inserted into the syntax analysis unit 810 for the operation of the syntax analysis unit 710 or can be stored in an addition storage unit for reference.

The element information stored in the element information storage unit 720 can be referred to by the elements operating to analyze the subsequent bitstream syntax and/or to decode the bitstream.

The element information stored in the element information storage unit 720 can include names and actual values of elements analyzed using the syntax element table 820, the CSCI table 830, and the syntax rule table 840.

The element information supplied from the syntax element table 820, the CSCI table 830, and the syntax rule table 840 at the time of analyzing the syntax elements can include an order of the syntax elements, lengths of the syntax elements, syntax types of the syntax elements, correlations between the syntax elements, and ranges of other elements using the syntax elements.

Hereinafter, the syntax analysis method of the analysis processor 810 will be described specifically. For the purpose of convenient explanation, the syntax element table 820 is referred to as "SET", the CSCI table 830 is referred to as "CSCIT", and the syntax rule table 840 is referred to as "RT."

The analysis processor 810 extracts the RT 840 from the received universal bitstream or receives the RT 840 as additional data.

The RT 840 can be constructed as shown in Table 3.

TABLE 3

Configuration of RT

| Index No. | No. of nput | No. of branches | Branch 1 | Branch 2 |
|---|---|---|---|---|
| RE | — | | | |
| R0 | | 1 | TRUE → (S1, R1) | |
| R1 | 1 | 2 | C1== FALSE → (NULL, RE) | C1==TRUE → (S2, R2) |
| R2 | | 1 | TRUE → (S3, R3) | |
| R3 | 1 | 2 | C1==FALSE → (S5, R4) | C1==TRUE → (S4, R5) |
| R4 | 1 | 2 | C1==FALSE → (NULL, RE) | C1==TRUE → (S6, R6) |
| R5 | | 1 | TRUE → (S5, R4) | |
| R6 | 4 | 2 | C4==FALSE → (S9, R9) | C4==TRUE → (S7, R7) |
| R7 | | 1 | TRUE → (S8, R8) | |
| R8 | | 1 | TRUE → (S9, R9) | |
| R9 | 1 | 2 | C1==FALSE → (NULL, RE) | C1==TRUE → (S10, R10) |
| ... | ... | ... | ... | ... |

1) RE: syntax decoding error

The analysis processor 810 can recognize connectivity information between the syntax elements in the input bitstream by the use of the RT.

As shown in Table 3, the RT 840 includes a field of "index No." for identifying the connectivity between the syntax elements, a field of "input" indicating an input value (that is, any element information (control signal and context information) stored previously in the element information storage unit 720) for controlling the connectivity between the syntax elements, a field of "No. of branches" indicating the number of elements which can be connected to the current syntax element, and a field of "branch #" indicating a branch path corresponding to branch conditions.

The field of "input" exists only when the number of syntax elements connectable is plural and the branches can be controlled using the value. For example, since "index No." R2 has no branch, the input value thereof does not exist, but since "index No." R3 has a branch, the input value there of exists.

The field of "branch #" has a branch condition for branching the corresponding path (for example, C4==FALSE). When no branch condition exists, the field of "branch #" is always recognized as "TRUE" similarly to "index No." R5. In the back of the branch condition, a pair of syntax element specifying information (for example, index number "S9" in the SET 820) and next connectivity information (for example, index number such as "R9" in the RT 840) in the RT 840 is described.

In this way, the decoder 700 according to a preferred embodiment of the present invention has an advantage that it is possible to analyze the syntax elements of an input bitstream by changing (for example, correcting, adding, or deleting) only the corresponding information in the RT 840 even when a new standard is established or the syntax structure of an existing standard is changed (for example, corrected, added, or deleted).

The analysis processor 810 extracts or creates an SET output value using the syntax element specifying information with reference to the SET 820 and stores the extracted or created element information in the element information storage unit 720. As described above, it is obvious that the analysis processor 810 can transmit the extracted or created element information (for example, analyzed values) to the variable length decoding unit 110 and the variable length decoding unit 110 can convert the received element information into semantics data and store the semantics data in the element information storage unit 720. The SET output value may be a control signal and context information.

The SET 820 can be configured as shown in Table 4.

TABLE 4

Configuration of SET

| Index No. | Name of Syntax Element | Input | utput | Process |
|---|---|---|---|---|
| S1 | Vo_sequence_start_code | 32 bit string | 1 | Read ibs if ibs == 0x000001B1, C1 = TRUE else C1 = FALSE |
| S2 | Profile_level_indication | 8-bit integer | 2 | Read ibs C2 = ibs |
| S3 | User_data_start_code | 32-bit string | 1 | Read ibs If ibs == 0x000001B2, C1 = TRUE Else C1 = FALSE |
| S4 | User_data | 8 bit string | 3 | Char a1, a2; While(TRUE) Read ibs; If (ibs == 0x00) A1= ibs; Read ibs; if (ibs == 0x00) A2=ibs; Read ibs; If(ibs==0x00 \|\| ibs==0x01) Unread ibs; Unread a2; Unread a1; Break; Else concatenate (C3,A1); concatenate (C3,A2); concatenate (C3,ibs); Else concatenate (C3,A1); concatenate (C3,ibs); Else concatenate (C3,ibs) |
| S5 | Vo_start_code | 32-bit string | 1 | Read ibs If ibs == 0x000001B5, C1 = TRUE Else C1 = FALSE |
| S6 | Is_VO_identifier | 1-bit flag | 4 | Read ibs C4 = ibs |
| S7 | VO_verid | 4-bit | 5 | Read ibs C5 = ibs |
| S8 | VO_priority | 3-bit | 6 | Read ibs C6 = ibs |
| S9 | VO_type | 4-bit | 1 | Read ibs If (ibs == '001' C1=TRUE |

TABLE 4-continued

Configuration of SET

| Index No. | Name of Syntax Element | Input | Output | Process |
|---|---|---|---|---|
| S10 | Video_signal_type | 1-bit | 7 | Else C1=FALSE Read ibs C7 = ibs |
| ... | ... | ... | ... | ... |

1) ibs: input bit string
2) vbs: variable bit string
3) In describing the process of SET, there may be repetitive operations (such as S6, S7, S8, S10)

As shown in Table 4, the SET 820 includes index, name, input data, output data, and process of each syntax element.

The index is an identifier used as the syntax element specifying information in the RT 840 and the input data indicate the length of the corresponding data as data of a bitstream. The output data serves as the control signal and context information and are created or extracted by a process specified every syntax element index. Incidentally, in order to perform a specified process in general, the output data should be converted into the semantics data by the variable length decoding unit 110. This is a case where the corresponding data exist in a variable length table. However, when the variable length table is not necessary, an original syntax value is processed in a specified process. A sign (for example, C1) for identifying the output (CSCI) data corresponding to the syntax elements is partially repeatedly marked in Table 4, but this is intended for the signs to agree to the indexes of the CSCIT 830. If only the corresponding CSCIT output value can be created, the signs (for example, C1) corresponding to all the syntax elements may be specified non-repeatedly.

For example, a name of a syntax element of which the index is "S1" is "Vo_sequence_start_code", the input data are a 32 bit string in a bitstream, and the SET output value corresponding to a process is created or extracted.

The analysis processor 810 may perform a repeated operation to a certain syntax element (for example, indexes S2, S6, S7, S8, S10, and the like) at the time of creating or extracting the SET output value using the SET 820.

Detailed information (that is, CSCIT output value) on the SET output value which is created or extracted using the SET 820 and is stored in the element information storage unit 720 by the analysis processor 810 is created using the CSCIT 830 and the created CSCIT output value is stored in the element information storage unit 720. Here, the CSCIT output value can include semantics of the CSCIT and the corresponding actual value.

The CSCIT 830 can be constructed as shown in Table 5.

TABLE 5

Configuration of CSCIT

| Index No. | Control signal/context information | Description | Global/local |
|---|---|---|---|
| C1 | DECODE_OK | Bool 1 bit flag | Syntax FU |
| C2 | PROFILE_LEVEL_INDICATION | 8-bit integer | All |
| C3 | USER_DATA | 8-bit integer* | All |
| C4 | IS_VO_IDENTIFIER | 1-bit flag | Syntax FU |

TABLE 5-continued

Configuration of CSCIT

| Index No. | Control signal/context information | Description | Global/local |
|---|---|---|---|
| C5 | VO_VER_ID | 4-bit flag | All |
| C6 | VO_PRIORITY | 3-bit | All |
| C7 | VIDEO_SIGNAL_TYPE | 1-BIT | Syntax FU |
| ... | ... | ... | ... |

1) *sequence or array
2) Global/local: if a CSCI is used only in Syntax parsing FU(Functional Unit), it is local.

As shown in Table 5, the CSCIT 830 includes indexes identified by the identifiers (for example, C1) of the SET output values, names of the SET output values, characteristics of the SET output values, and ranges for use of the SET output values (that is, the entire decoding process or a part of the entire decoding process (for example, a syntax parsing process)).

Hereinafter, a syntax analysis process in the header area of the bitstream by the syntax analysis unit 710 will be briefly described with reference to FIG. 9. The empty circular shapes shown in FIG. 9 indicate a "null" value (see RT 840).

First, when a bitstream is input, the syntax analysis unit 710 starts its operation from an index number "R0" using the RT 840 (see Table 3).

Since the syntax analysis unit 710 does not require an input value in processing the index number "R0" in the RT 840, the syntax analysis unit 710 analyzes the condition "True" as being satisfied and then processes the index number "S1" of the SET 820 (see Table 4). That is, as shown in Table 4, the branch condition in the index number "R0" of the RT 840 is specified as "TRUE→(S1, R1)." When the condition "True" is satisfied, the syntax analysis unit 710 processes the index number "S1" of the SET 820 (see Table 4) and then processes the index number "R1" of the RT 840.

In order to process the index number "S1" in the SET 820, the syntax analysis unit 710 reads out a syntax element "VO_sequence_start_code" formed of a 32 bit string from the header area of a bitstream. The method of reading out the syntax elements from the header area of the bitstream is obvious to those skilled in the art and thus description thereof will be omitted. Subsequently, the syntax analysis unit 710 determines whether the readout value is "True" or "False" depending on the process (that is, if ibs==0x000001B1) and stores the determined value as the SET output value in the element information storage unit 720. As described above, the storage of the element information in the element information storage unit 720 may be performed by the variable length decoding unit 110.

The syntax analysis unit 710 reads out the CSCIT output value (that is, the semantics of CSCI and the corresponding value) corresponding to the determined SET output value (that is, C1) by the use of the CSCIT 830 and stores the readout value in the element information storage unit 720.

The syntax analysis unit 710 processes the index number "R1" in the RT 840 after processing the index number "S1" in the SET 820.

Since the syntax analysis unit 710 requires the input value "C1" for processing the index number "R1" in the RT 840, the syntax analysis unit 710 reads out the control signal and context information stored in the element information storage unit 720 by processing the index number "R0" and uses the readout information as the input value.

In this way, the syntax analysis unit 710 according to a preferred embodiment of the present invention can use information extracted or created by the previous syntax element analysis at the time of the syntax element analysis. Similarly, the element information stored in the element information storage unit 720 (that is, information output as the SET output value and the CSCIT output value) can be used by other elements at the time of decoding a bitstream.

When the CSCIT information read out from the element information storage unit 720 for processing the index number "R1" in the RT 840 is "True", the syntax analysis unit 710 processes the index number "S2" in the SET 820 (and creates the CSCIT output value corresponding to the process result of the index number "S2" in the SET 820 from the CSCIT 830) and then process the index number "R2" in the RT 840. However, when the readout CSCIT information is "False", the syntax analysis unit 710 processes "NULL" to determine a syntax decoding error (index number "RE").

By repeating the above-mentioned processes, the syntax analysis process to the header area of the bitstream shown in FIG. 9 can be completed. The element information extracted or created in the syntax analysis process is stored in the element information storage unit 720 and can be used for analysis or decoding of the subsequent syntax elements.

The above-mentioned syntax analysis process is shown in Table 6.

TABLE 6

Syntax Analysis Flow

| Control flow | Branch Control | SET | CSCIT | Description |
| --- | --- | --- | --- | --- |
| 1 | R0 | | | |
| 2 | | S1 | C1 | Vo_sequence_start_code |
| 3 | R1 | | C1 | |
| 4 | | S2 | C2 | Profile_level_indication |
| 5 | R2 | | | |
| 6 | | S3 | C1 | User_data_start_code |
| 7 | R3 | | C1 | |
| 8 | | S4 | C3 | User_data |
| 9 | R5 | | | |
| 10 | | S5 | | Vo_start_code |
| 11 | R4 | | | |
| 12 | | S6 | | Is_VO_identifier |
| 13 | R6 | | | |
| 14 | | S9 | | VO_type |
| ... | ... | ... | ... | ... |

The flow shown in Table 6 is analyzed in the zigzag order from the left-upper end. That is, the analysis processor 810 performs the syntax element analysis in the order of R0, S1, and C1, where C1 is used as an input value of R1, and the syntax element analysis is then performed in the order of S2 and C2.

Encoder According to Another Exemplary Embodiment of the Invention

Figure 10:
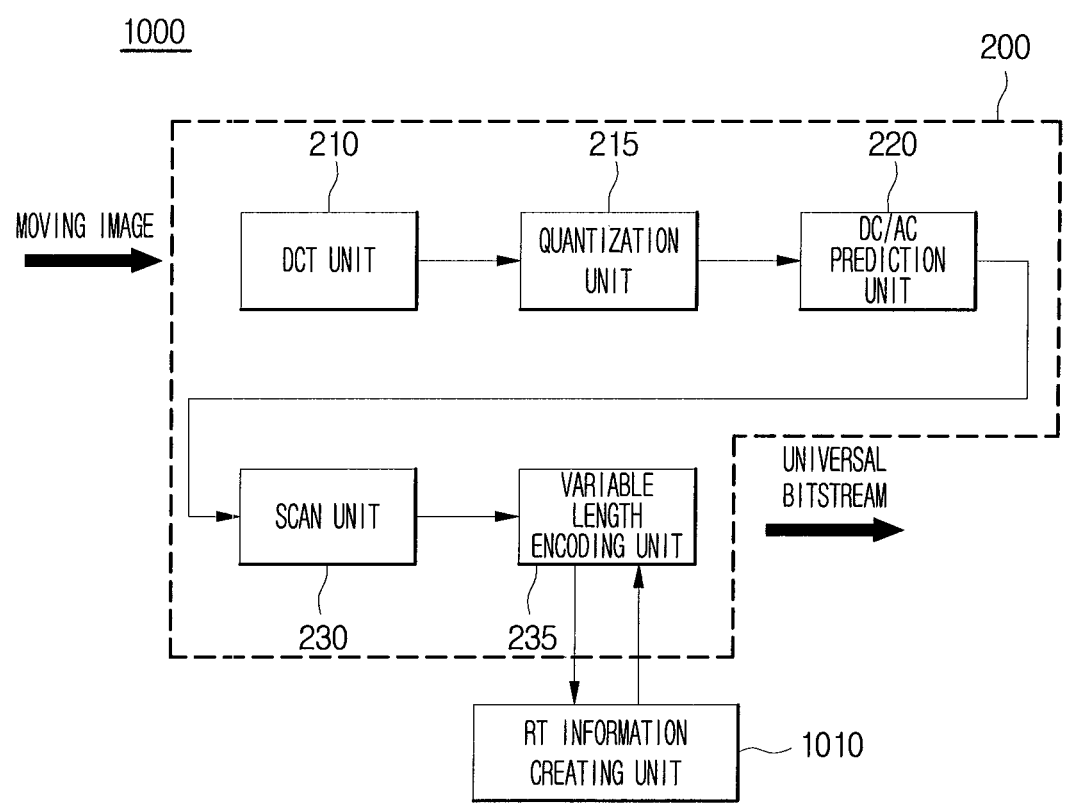
FIG. 10 is a diagram schematically illustrating a configuration of an encoder according to another preferred embodiment of the present invention.

FIG. 10 is a diagram schematically illustrating a configuration of an encoder according to another exemplary embodiment of the invention.

As shown in FIG. 10, the encoder 1000 according to the exemplary embodiment of the invention further includes an RT information creating unit 1010, in addition to the elements of the known encoder 200 (hereinafter, referred to as an "encoding unit"). The illustrated configuration of the encoder 1000 is only an example. Any configuration may be employed if only it can encode an input moving image into a bitstream and the configuration may be variously modified depending on employed standards.

The RT information creating unit 1010 may be dependently coupled to the variable length encoding unit 235 as shown in FIG. 10, may be inserted into the variable length encoding unit 235, or may be disposed at a rear stage of the variable length encoding unit 235. This is because that the RT 840 is generally created continuously and successively in the course of encoding. Of course, the location of the RT information creating unit 1010 may be modified variously depending on the design and implement methods. For example, the RT information creating unit 1010 may be embodied as a finite state machine (FSM).

The method of allowing the RT information creating unit 1010 to create the RT information can be easily understood with reference to the above description of the decoder 700 and thus description there of will be omitted. The elements required for the RT information creating unit 1010 to create the RT information will be obvious to those skilled in the art and thus description thereof will be also omitted.

The RT information creating unit 1010 can create a universal bitstream to which the created RT information is added or request the variable length encoding unit 235 to create the universal bitstream. The RT information created by the RT information creating unit 1010 may be transmitted to the decoder 700 from the RT information creating unit 1010 or the variable length encoding unit 235 in the form of independent data or file. The RT information creating unit 1010 can supply at least one of the SET 820 and the CSCIT 830 in addition to the RT 840 to the decoder 700, as described above.

The variable length encoding unit 235 in this description indicates only an element (for example, an encoding unit) for finally performing an encoding operation to create a bitstream in the decoder 300, but the scope of the invention is not limited due to it.

As described above, the decoder and the syntax analysis method according to the present invention can facilitate the analysis of syntax elements in a standard (or codec) or between different standards (or codecs). That is, it is possible to change the order of syntax elements in a bitstream created in accordance with a specific standard, to insert new syntax elements therein, or to delete existing syntax elements.

According to the known techniques, there was a problem that the decoder could not decode normally a bitstream at the time of changing syntax elements. For example, when a bitstream having information of ABC is changed to have information of ACB, the decoder cannot recognize the change and cannot decode the bitstream normally. The same problem occurs when F is newly inserted to form a bitstream having information of ABFC or when B is deleted to form a bitstream having information of AC.

However, in the decoder and the syntax analysis method for decoding a bitstream according to the present invention, since the RT 840 is included in the universal bitstream or is supplied as independent data, a smooth decoding operation can be performed by the decoder.

Although the decoder and the syntax analysis method for decoding a bitstream according to the present invention have been described with reference to MPEG-4, the invention can be applied to MPEG-1, MPEG-2, MPEG-4 AVC, and other moving image encoding/decoding standards without any limitation.

The drawings and the detailed description of the invention are intended to exemplify the present invention, but are not intended to limit the scope of the present invention described in the attached claims. It can be understood by those skilled in the art that a variety of modifications can be made therein. Therefore, the range of technical protection of the invention will be determined with the technical spirit and scope described in the attached claims.

INDUSTRIAL APPLICABILITY

According to the exemplary embodiments of the invention described above, it is possible to decode bitstreams encoded in a variety of types (syntax, semantics) corresponding to a variety of standards (for example, MPEG-1, MPEG-2, MPEG-4, and MPEG-4 AVC) by the use of the same information recognition method.

According to the present invention, it is possible to perform a normal decoding operation, regardless of change in syntax at the time of encoding a bitstream.

According to the present invention, it is possible to manage various syntax structures of various standards with reference to similarity of semantics in a unified manner.

According to the present invention, it is possible to easily analyze bitstream syntax so as to decode various types of bitstreams with a unified codec and/or a general codec.

According to the present invention, it is possible to commonly employ a syntax analysis method for decoding various types of bitstreams.

According to the present invention, it is possible to allow elements used for decoding bitstreams to share element information of analyzed syntax (that is, information created by syntax element analysis).

According to the present invention, it is possible to use element information (that is, information created by syntax element analysis) for syntax element analysis of subsequent bitstreams.

According to the present invention, it is possible to standardize a concept and a structure for unified decoding of bitstreams.

What is claimed is:

1. A decoder comprising:
an input configured to receive a bitstream created by an encoder,
wherein the bitstream includes rule description information;
a condition information extracting unit configured to create recognition information using syntax tree information indicating a hierarchical structure between syntax elements corresponding to bits of the bitstream, respectively, and the rule description information,
wherein the rule description information indicates connectivity between the syntax elements, and includes connectivity information and branch information between group elements indicating layers and information elements constituting a corresponding group; and
a decoding unit configured to decode data contained in the bitstream into moving image data using the recognition information,
wherein the syntax tree information indicates a hierarchical dependence between a plurality of group elements and a plurality of information elements,
wherein the recognition information includes syntax information corresponding to the bits of the bitstream and semantics corresponding to the syntax information,
wherein the syntax information includes at least one of a syntax order, a syntax length, and a syntax data type, and
wherein branch information changes an information element connected to a current information element depending on satisfaction of a predetermined condition.

2. The decoder according to claim 1, wherein the input is further configured to receive at least one of the syntax tree information and standard information from the encoder.

3. The decoder according to claim 1, wherein at least one of a syntax element included in the syntax tree information, a hierarchical relation between syntax elements, and semantics corresponding to the syntax elements can be added, deleted, or updated.

4. An encoder comprising:
an encoding unit configured to encode an input moving image;
an output configured to transmit, to a decoder, a bitstream created by the encoder based, in part, on the encoded input moving image; and
a condition information creating unit configured to create rule descriptive information and transmit the rule descriptive information to the encoding unit,
wherein the bitstream includes the rule descriptive information transmitted to the encoding unit by the condition information creating unit,
wherein the condition information creating unit is further configured to store syntax tree information indicating a hierarchical dependence between syntax elements corresponding to bits of the bitstream, and create the rule descriptive information using information corresponding to the syntax elements of the bits among the syntax tree information,
wherein the syntax elements include a plurality of group elements and a plurality of information elements,
wherein the rule descriptive information includes connectivity information and branch information between the group elements indicating layers and the information elements constituting a corresponding group, and
wherein the branch information changes an information element connected to a current information element depending on satisfaction of a predetermined condition.

5. The encoder according to claim 4, wherein the bitstream is constructed in the order of the rule descriptive information, header information, and compressed data or in the order of header rule information, the header information, data rule information, and the compressed data.

6. The encoder according to claim 4, wherein the rule descriptive information further includes standard information employed by the encoder having created the bitstream.

7. The encoder according to claim 4, wherein at least one of a syntax element included in the syntax tree information, a hierarchical relation between syntax elements, and semantics corresponding to the syntax elements can be added, deleted, or updated.

8. A bitstream decoding method of a decoder, the method comprising:
receiving, by the decoder, a bitstream created by an encoder,
wherein the bitstream includes rule description information;
creating, by the decoder, recognition information using syntax tree information indicating a hierarchical structure between syntax elements of the bitstream and the rule description information indicating connectivity between the syntax elements; and
decoding, by the decoder, data contained in the bitstream into moving image data using the recognition information,
wherein the rule description information includes connectivity information and branch information between group elements indicating layers and information elements constituting a corresponding group, wherein branch information changes an information element connected to a current information element depending on satisfaction of a predetermined condition, and wherein the syntax tree information indicates a hierarchical dependence between a plurality of group elements and a plurality of information elements, the recognition information includes syntax information corresponding to the bits of the bitstream and semantics corresponding to the syntax information, and the syntax information includes at least one of a syntax order, a syntax length, and a syntax data type.

9. A bitstream creating method in an encoder, the method comprising:

encoding, by the encoder, an input moving image;

transmitting, via an output of the encoder to a decoder, a bitstream created by the encoder based, in part, on the encoded input moving image; and creating, by the encoder, rule description information wherein the bitstream includes the rule descriptive information, wherein the rule description information indicates connectivity between syntax elements corresponding to bits of the bitstream, and includes connectivity information and branch information between group elements indicating layers and information elements constituting a corresponding group, wherein branch information changes an information element connected to a current information element depending on satisfaction of a predetermined condition, and wherein the bitstream is constructed in the order of the rule description information, head information, and compressed data or in the order of header rule information, the head information, data rule information, and the compressed data.

10. A decoder comprising:

an element information storage unit configured to store information corresponding to bitstream syntax elements;

an input configured to receive a bitstream created by an encoder;

a syntax analysis unit configured to specify an analysis order of the bitstream syntax elements included in a header area of the bitstream using syntax rule information, create a control signal and context information using syntax element information in the specified analysis order of the syntax elements, and store the control signal and context information in the element information storage unit; and a decoding unit decoding data included in the bitstream into moving image data using the control signal and context information, wherein the syntax rule information indicates connectivity between the syntax elements, wherein the syntax rule information includes connectivity information and branch information between group elements indicating layers and information elements constituting a corresponding group, and wherein branch information changes an information element connected to a current information element depending on satisfaction of a predetermined condition.

11. The decoder according to claim 10, wherein the syntax analysis unit creates the control signal and context information and a corresponding value using the control signal and context information and then stores the created information in the element information storage unit.

12. The decoder according to claim 11, wherein the syntax rule information, the syntax element information, and the control signal and context information are embodied by binary codes.

13. The decoder according to claim 10, wherein the syntax analysis unit reads out a proper control signal and context information from the control signal and context information stored in the element information storage unit and analyzes a current syntax element.

14. The decoder according to claim 1, wherein the group elements include Visual Session (VS), Visual Object (VO), Video Object Layer (VOL), Video Object Plane (VOP), Macro Block (MB), or Block (B).

15. The bit stream decoding method according to claim 8, wherein the decoder receives at least one of the syntax tree information and standard information from the encoder.

* * * * *